UNITED STATES PATENT OFFICE.

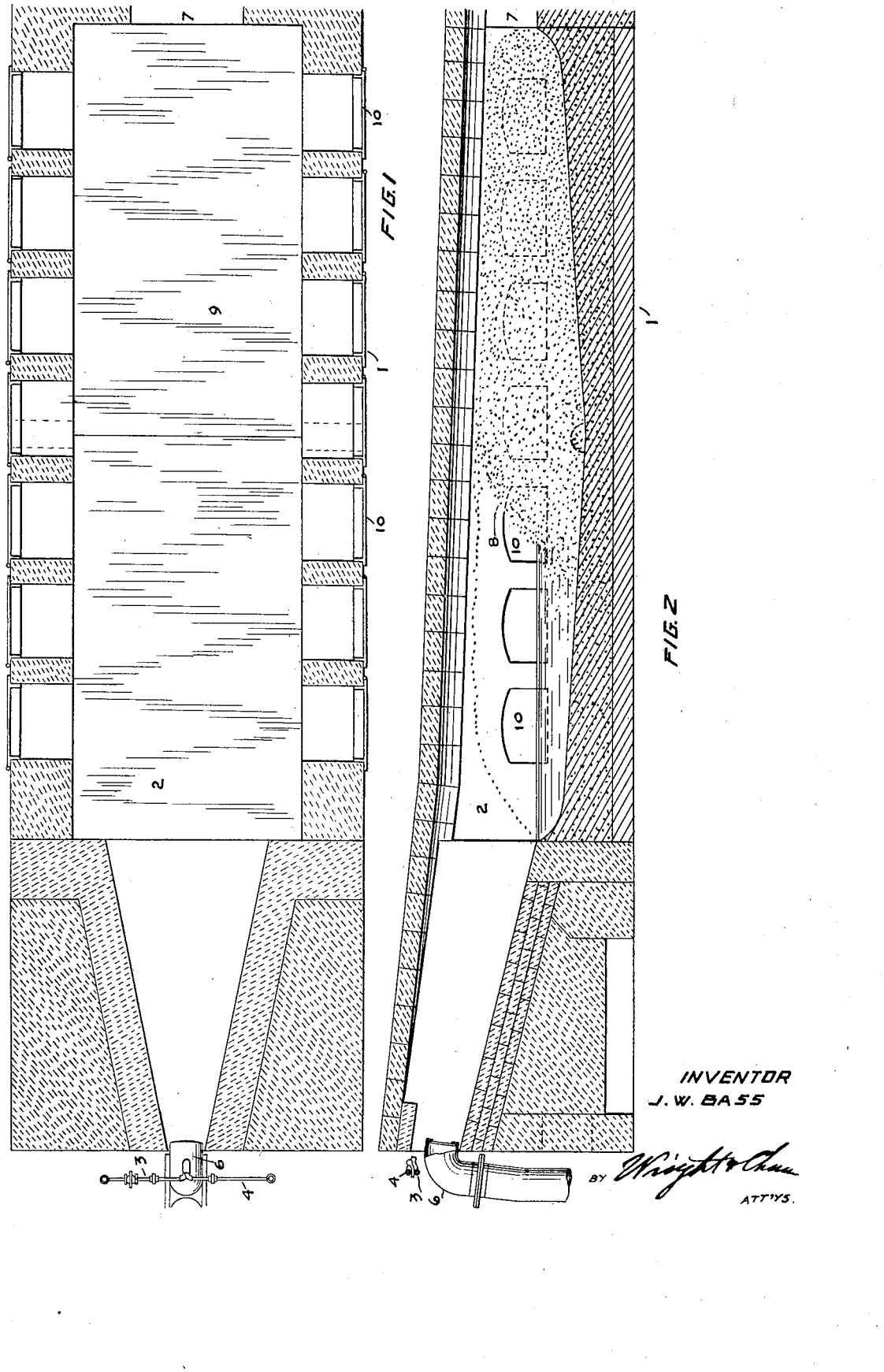

JOSEPH WALTER BASS, OF SAN FRANCISCO, CALIFORNIA.

METALLURGICAL PROCESS.

1,386,226. Specification of Letters Patent. Patented Aug. 2, 1921.

Application filed May 3, 1920. Serial No. 378,667.

*To all whom it may concern:*

Be it known that I, JOSEPH WALTER BASS, a subject of the King of Great Britain, residing at San Francisco, in the county of San Francisco and State of California, have invented new and useful Improvements in Metallurgical Processes, of which the following is a specification.

The present invention relates to an improved method of and apparatus for melting in the bulk small pieces of metal such as metallic filings, turnings and borings.

Many attempts have been made to melt metal borings and the like but these attempts have been unsuccessful due to too great a loss of metal through oxidization. The only successful method so far as I am aware that has been carried out requires first, the forming of briquets of the borings or turnings before melting. This method however, involves considerable expense as to the apparatus necessary to perform the briqueting and takes considerable time in that it involves two separate treatments of the borings or filings. Therefore taking everything into consideration metal turnings and borings are still as they are always been, a "drug on the market."

I have found that with the method and apparatus of my invention I can melt borings, filings, and the like in the bulk, in such a way that only about a ten per cent. loss by oxidization is incurred and a minimum of time and expense is required to bring about an effective melting in an ordinary reverberatory or other similar type of furnace. Therefore with my improved method and apparatus I eliminate the objections and difficulties which heretofore attended the melting of metal borings, filings, and the like.

Referring to the drawings, Figure 1 is a horizontal sectional view of my apparatus and Fig. 2 is a longitudinal vertical sectional view thereof.

The apparatus utilized in carrying out my improved method comprises an ordinary furnace of the type generally known as reverberatory and modified slightly as to construction.

The furnace 1 comprises a combustion chamber 2 in which a mixture of oil and air is subjected to combustion, said oil through a pipe 3 and the air through a pipe 4, the air necessary for the support of said combustion being supplied by a pipe 6. A flue 7 is provided at one end of the furnace in the customary manner. The turnings or borings 8 are spread out in bulk upon the floor 9 of the furnace to any desired level but so as to leave a horizontal flue space along the top of the borings thus spread out. To facilitate ready access to all parts of the spread out borings or filings, during the treatment thereof I provide along the side walls of the furnace a plurality of openings closed in the usual manner by doors 10.

In carrying out my improved method I first spread upon the floor of the furnace a large quantity of borings or the like, for example from 4 to 25 tons, or even less as desired. The material is spread out preferably evenly along the entire floor but so as to provide a relatively bulky mass, there being left sufficient room at the top of the spread out mass to provide a horizontal flue through which the products of combustion are adapted to pass to the flue 7. The fire in the burner is started, at first slowly, so as not to give too intense a heat. The products of combustion will pass over the top of the spread out mass of screenings. The heat of combustion will cause the screenings or borings along the top of the spread out mass to melt and form a light crust over the entire top of the spread out material. As the fire is directed from one end of the furnace, the screenings at the end of the spread out mass, next adjacent to the burner will first melt and the melting will take place successively from this end on through to the opposite end of the spread out mass or pile of metal. As the metal melts on the upper surface or top of the spread out mass, the molten metal runs down between the interstices of the borings lying beneath the surface and solidifies so that a crust is formed beneath which crust the heat can penetrate only slightly. Therefore, the borings are protected from oxidization while being melted. After the crust is formed the heat is increased in intensity so that beginning at one end of the spread out mass of borings, the melting will commence and then continue on through to the other end. In order to effect this continuous melting from one end to the other, a suitable stirrer is employed. The stirrer is inserted through one of the doors into the borings under the crust which has been formed and a small quantity of borings are loosened so as to permit heat to have access to said loosened or stirred up borings. This presents only a small quantity of the borings to the action of the intense heat and as a result, the melting takes place so rapidly that there is practically no loss by oxidization. By following this method successively and melting of the borings step by step in small quantities in the direction of the flow of combustion, the entire spread out mass will be melted effectively without an appreciable loss of oxidization.

I claim:—

1. The method of melting borings, turnings, or other small metallic pieces in bulk form which consists in spreading them on the bottom of a furnace, causing the products of combustion of fuel to flow over the upper side of the metal thus spread out and agitating portions of said metal successively in the direction of flow of said products of combustion.

2. A furnace for melting borings, turnings or other small metallic pieces in bulk form having openings in its side walls permitting access to be obtained by a metallic stirrer to all parts of the material laid upon the floor of the furnace.

3. The method of melting borings, turnings, or other small metallic pieces in the bulk, which consists in spreading them in bulk form along the bottom of a furnace, applying heat to the upper surface of the spread out portion so as to cause a crust to form over the entire surface of the material spread out, causing the products of combustion of fuel to flow from one end of the spread out mass over the upper side of said mass and agitating portions of said metal successively in the direction of flow of products of combustion from one end of the material to the other.

JOSEPH WALTER BASS.